(12) United States Patent
Barnes et al.

(10) Patent No.: US 6,431,443 B1
(45) Date of Patent: *Aug. 13, 2002

(54) OVERLOADED CARD INFORMATION DISPLAY

(75) Inventors: Stacey Alan Barnes, Round Rock; Viktors Berstis, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,290

(22) Filed: Dec. 17, 1999

(51) Int. Cl.[7] ................................................. G06K 5/00
(52) U.S. Cl. .................. 235/380; 235/382; 235/379; 235/449; 235/487; 705/41; 705/42; 705/43; 705/44
(58) Field of Search ................................. 235/375, 380, 235/492, 382, 449, 487, 379, 384, 488; 705/42, 41, 43, 44

(56) References Cited

U.S. PATENT DOCUMENTS

| | | | |
|---|---|---|---|
| 4,443,027 A | | 4/1984 | McNeely et al. |
| 4,575,621 A | * | 3/1986 | Dreifus ........................ 235/380 |
| 4,593,936 A | | 6/1986 | Opel |
| 4,614,861 A | * | 9/1986 | Pavlov et al. ................ 235/380 |
| 4,700,055 A | | 10/1987 | Kashkashian, Jr. |
| 4,717,815 A | * | 1/1988 | Tomer ......................... 235/378 |
| 4,766,293 A | * | 8/1988 | Boston ........................ 235/379 |
| 4,766,294 A | * | 8/1988 | Nara et al. ................... 235/380 |
| 4,771,460 A | | 9/1988 | Tamada et al. |
| 4,797,542 A | * | 1/1989 | Hara ........................... 235/380 |
| 4,800,255 A | * | 1/1989 | Imran ......................... 235/382 |
| 4,806,745 A | * | 2/1989 | Oogita ........................ 235/492 |
| 4,812,634 A | * | 3/1989 | Ohta et al. ................... 235/492 |
| 4,851,654 A | * | 7/1989 | Nitta ........................... 235/492 |
| 4,868,376 A | * | 9/1989 | Lessin et al. ................ 235/492 |
| 4,874,934 A | * | 10/1989 | Nakahara et al. ........... 235/492 |
| 4,876,441 A | * | 10/1989 | Hara et al. ................... 235/488 |
| 4,973,828 A | | 11/1990 | Naruse et al. .............. 235/380 |

(List continued on next page.)

FOREIGN PATENT DOCUMENTS

| | | |
|---|---|---|
| DE | 4138131 A1 * | 4/1993 |
| DE | 004138131 A1 | 4/1993 |
| JP | 4367090 A * | 12/1992 |
| JP | 404367090 A | 12/1992 |
| JP | 5210771 A * | 8/1993 |
| JP | 405210771 A | 8/1993 |

OTHER PUBLICATIONS

U.S. patent application Ser. No. 09/465,289, Barnes et al., filed Dec. 17, 1999.
U.S. patent application Ser. No. 09/465,291, Stacey et al., filed Dec. 17, 1999.
U.S. patent application Ser. No. 09/465,293, Barnes et al., filed Dec. 17, 1999.

*Primary Examiner*—Karl D. Frech
*Assistant Examiner*—Uyen-Chau Le
(74) *Attorney, Agent, or Firm*—Marilyn Smith Dawkins; Bracewell & Patterson, L.L.P.

(57) ABSTRACT

A card structure provides an existing card having an associated card service and further having at least one associated service of at least one other card that is used by a card user. A display is coupled to the card structure for displaying desired information on the overloaded card. The overloaded card display comprises a silicone sheet display having embedded thereon an array of electrostatically chargeable balls. An electric charge is applied to each of the balls so that each of the balls is in a desired position to display the information on the overloaded card. The card is read by a reader at a card terminal, and an array of electrodes that charge and manipulate the balls face the display to charge them so that images programmed at the electrodes are left thereon.

18 Claims, 5 Drawing Sheets

U.S. PATENT DOCUMENTS

| | | | | |
|---|---|---|---|---|
| 5,055,662 A | 10/1991 | Hasegawa | ................... | 235/492 |
| 5,072,103 A | * 12/1991 | Nara | ........................ | 235/492 |
| 5,223,699 A | 6/1993 | Flynn et al. | | |
| 5,239,583 A | 8/1993 | Parillo | | |
| 5,276,311 A | 1/1994 | Hennige | ..................... | 235/380 |
| 5,324,922 A | 6/1994 | Roberts | | |
| 5,388,148 A | 2/1995 | Seiderman | .................. | 379/59 |
| 5,477,040 A | 12/1995 | Lalonde | | |
| 5,478,994 A | 12/1995 | Rahman et al. | | |
| 5,521,363 A | 5/1996 | Tannenbaum | | |
| 5,530,232 A | 6/1996 | Taylor | | |
| 5,546,523 A | 8/1996 | Gatto | | |
| 5,550,897 A | 8/1996 | Seiderman | .................. | 379/59 |
| 5,559,313 A | 9/1996 | Claus et al. | | |
| 5,578,808 A | 11/1996 | Taylor | | |
| 5,590,038 A | 12/1996 | Pitroda | ...................... | 235/380 |
| 5,627,355 A | 5/1997 | Rahman et al. | | |
| 5,682,027 A | 10/1997 | Bertina et al. | | |
| 5,714,744 A | * 2/1998 | Brice | ........................ | 235/449 |
| 5,731,575 A | 3/1998 | Zingher et al. | | |
| 5,801,367 A | * 9/1998 | Asplund et al. | ............ | 235/384 |
| 5,850,599 A | 12/1998 | Seiderman | .................. | 379/144 |
| 5,859,419 A | 1/1999 | Wynn | | |
| 5,875,437 A | 2/1999 | Atkins | | |
| 5,884,271 A | 3/1999 | Pitroda | ....................... | 395/24 |
| 5,936,221 A | 8/1999 | Corder et al. | | |
| 5,940,511 A | 8/1999 | Wilfong | | |
| 5,955,961 A | 9/1999 | Wallerstein | | |
| 6,038,551 A | 3/2000 | Barlow et al. | | |
| 6,068,183 A | * 5/2000 | Freeman et al. | ............ | 235/375 |
| 6,145,739 A | 11/2000 | Bertina et al. | | |
| 6,216,955 B1 | * 4/2001 | Le Roux et al. | ............ | 235/492 |

* cited by examiner

OVERLOADED CARD INFORMATION DISPLAY

RELATED APPLICATION

The present invention is related to the subject matter of commonly assigned, copending U.S. patent applications: Ser. Nos. 09/465,292; 09/465,289; 09/465,291; and 09/465,293. The content of the above-identified applications is incorporated herein by reference.

BACKGROUND OF THE INVENTION

1. Technical Field

The present invention relates in general to a system and method for providing and processing or using a card associated to its own services and associated to other cards with their own services, and, in particular, to a system and method for overloading an existing card so that services of the existing card and services for other cards may be selectively or programmatically processed or used by having to only use the existing card. Still particularly, the present invention relates to a display or display area for an overloaded card.

2. Description of the Related Art

A person may typically carry a various number of cards, such as credit cards, driver's license card, membership cards, etc., with him or her. However, the carrying of so many cards may be quite cumbersome and bulky for a person. For example, the large number of cards may cause a person's wallet to bulge. Also, the tasks of managing and tracking so many cards may become quite a hassle or burden.

Various types of universal cards or smart cards have been developed to integrate convenience and usability of multiple cards of a user into a single card. For these types of universal cards or smart cards, a generic universal card or generic smart card is provided, and the card services from all the different cards that a person owns is associated and programmed to the single universal card or smart card. The single generic card is generally used to integrate card services from various cards, and the card itself has no other functions or inherent operations. Some of these universal cards or smart cards require changing, updating, and/or maintaining of stored data on the cards themselves or may require the informing of the card service providers of the various cards regarding the integration of the cards to the universal card or smart card. Furthermore, some of these universal cards or smart cards require a power source to maintain, store, and/or display the data on the card. U.S. Pat. No. 5,530,232 to Taylor; U.S. Pat. No. 4,700,055 to Kashkashian Jr.; U.S. Pat. No. 4,443,027 to McNeely et al.; U.S. Pat. No. 5,546,523 to Gatto; U.S. Pat. No. 4,593,936 to Opel; U.S. Pat. No. 5,276,311 to Hennige; U.S. Pat. No. 5,477,040 to Lalonde provide examples of such universal cards or smart cards.

However, the problem with universal cards or smart cards is that they require the providing of the additional generic cards that are not themselves inherently functional or operational cards. For authentication purposes, a vendor or business establishment may not simply accept the universal card or smart card on its face value and may still require seeing and verifying the existence of the actual, real card itself that has been integrated into the universal card or smart card. This requirement defeats one of the main purposes of having a universal card or smart card since the person would still have to carry the cards that were integrated into the single universal card or smart card in the event of an authentication or verification request.

Various reasons, such as advertising, account information, transaction information, security information, etc., exist for providing a display on a card. Providing a display for a card, such as a card that is wallet size (i.e. credit card, debit card, membership card, identification card, driver's license, etc.), may be cumbersome and inconvenient. The display may require its own independent power source. The display may be bulky and intrusive for card holders and users to carry.

Flexible flat sheet displays presently exist. One example of a flexible flat sheet display is a flexible black and white display. The display comprises a silicone sheet embedded with an array of electrically charged and maneuvered balls, which are electrets. Each ball or electret is colored white on one side and black on the other side. The sheet is impregnated with oil or other suitable fluid so that the balls are able to be freely rotated. Ser. No. 09/213,316 discloses such a flexible sheet display, and is incorporated by reference herein An electric field is applied in a particular manner to each ball so that it rotates to either show the respective white or black side. A desired display of information is able to be created thereon by simply controlling the manner of how the balls are charged and rotated to desired positions.

It would therefore be advantageous and desirable to provide a system and method for overloading an existing card having its own card service with at least one other card service of at least one other card to provide an overloaded card with overloaded card services and to provide a display on such an overloaded card. It would further be advantageous and desirable to provide an overloaded card information display that comprises the silicone sheet with electrostatically charged balls or electrets to provide a desired display of information thereon. It would also be advantageous and desirable to provide an overloaded card information display to provide and display various types of information such as advertising, account information, transaction information, security information, etc.

SUMMARY OF THE INVENTION

It is therefore one object of the present invention to provide a system and method for overloading an existing card having its own card service with at least one other card service of at least one other card to provide an overloaded card with overloaded card services and to provide a display on such an overloaded card.

It is another object of the present invention to provide an overloaded card information display that comprises the silicone sheet with electrostatically charged balls to provide a desired display of information thereon.

It is a further object of the present invention to provide an overloaded card information display to provide and display various types of information such as advertising, account information, transaction information, security information, etc.

The foregoing objects are achieved as is now described. A system and method of providing and using an overloaded card with overloaded card services and displaying information on the overloaded card. A card structure provides an existing card having an associated card service and further having at least one associated service of at least one other card that is used by a card user. A display is coupled to the card structure for displaying desired information on the overloaded card. The overloaded card display comprises a silicone sheet used as a display for the information on the overloaded card, an array of electrostatically chargeable balls embedded within the silicone sheet wherein each of the balls has a white side and a black side, and oil or other fluid impregnated within the silicone sheet so that the balls are able to freely rotate therein. An electric charge is applied to each of the balls so that the each of the balls is in a desired position to display the information on the overloaded card. Power is not required for the display. Multiple displays may be provided for each overloaded card. The card is read by a reader at a card terminal, and an array of electrodes that charge and manipulate the balls face the display to charge them so that images programmed at the electrodes are left thereon. The array of electrodes acts as a writer for the display.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a system and method for overloading an existing card having its own card service with at least one other card service of at least one other card and also provides an overloaded card information display for displaying information on the overloaded card. The present invention overloaded card information display comprises the silicone sheet with electrostatically charged balls to provide a desired display of information thereon. The present invention overloaded card information display provides and displays various types of information such as advertising, account information, transaction information, security information, etc.

The overloaded card avoids having to provide an additional generic card with no further function or operation to be used as the integrated card. The overloaded card has its own card service that is able to act as a default card service and also has card services from other cards that are able to be accessed and used as well. The overloaded existing card does not require the changing, updating, and/or maintaining of stored data on the card itself and does not require the informing of the card service providers of the various cards being integrated to the overloaded card. The overloaded existing card does not itself have to be modified in any way and does not require any power source for maintaining, storing, or displaying the data on the card.

Figure 1:
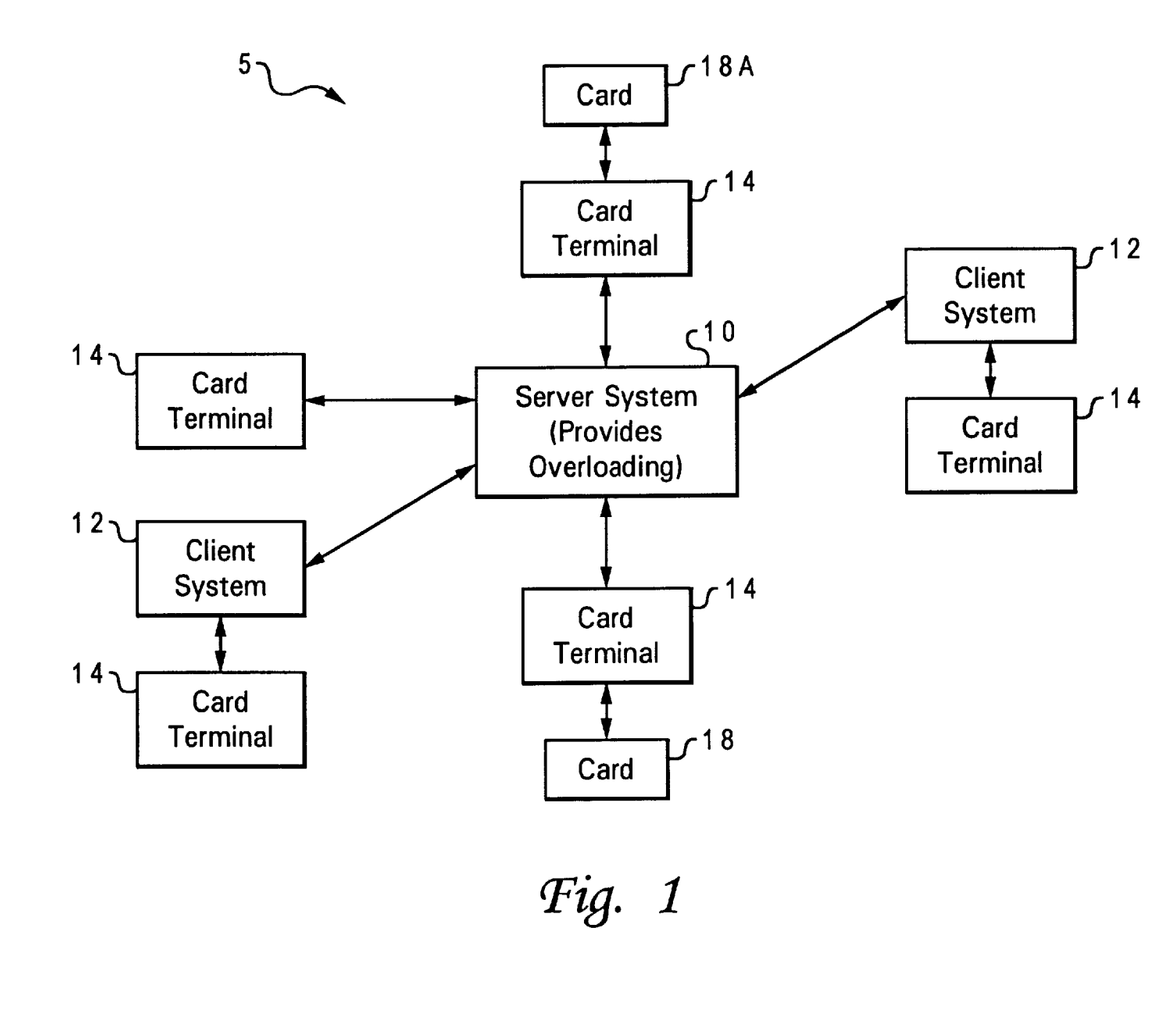
FIG. 1 is a block diagram illustrating a general topology of a server system, client systems, and card terminals that are used for providing the present invention system and method for overloading an existing card.
Figure 3:
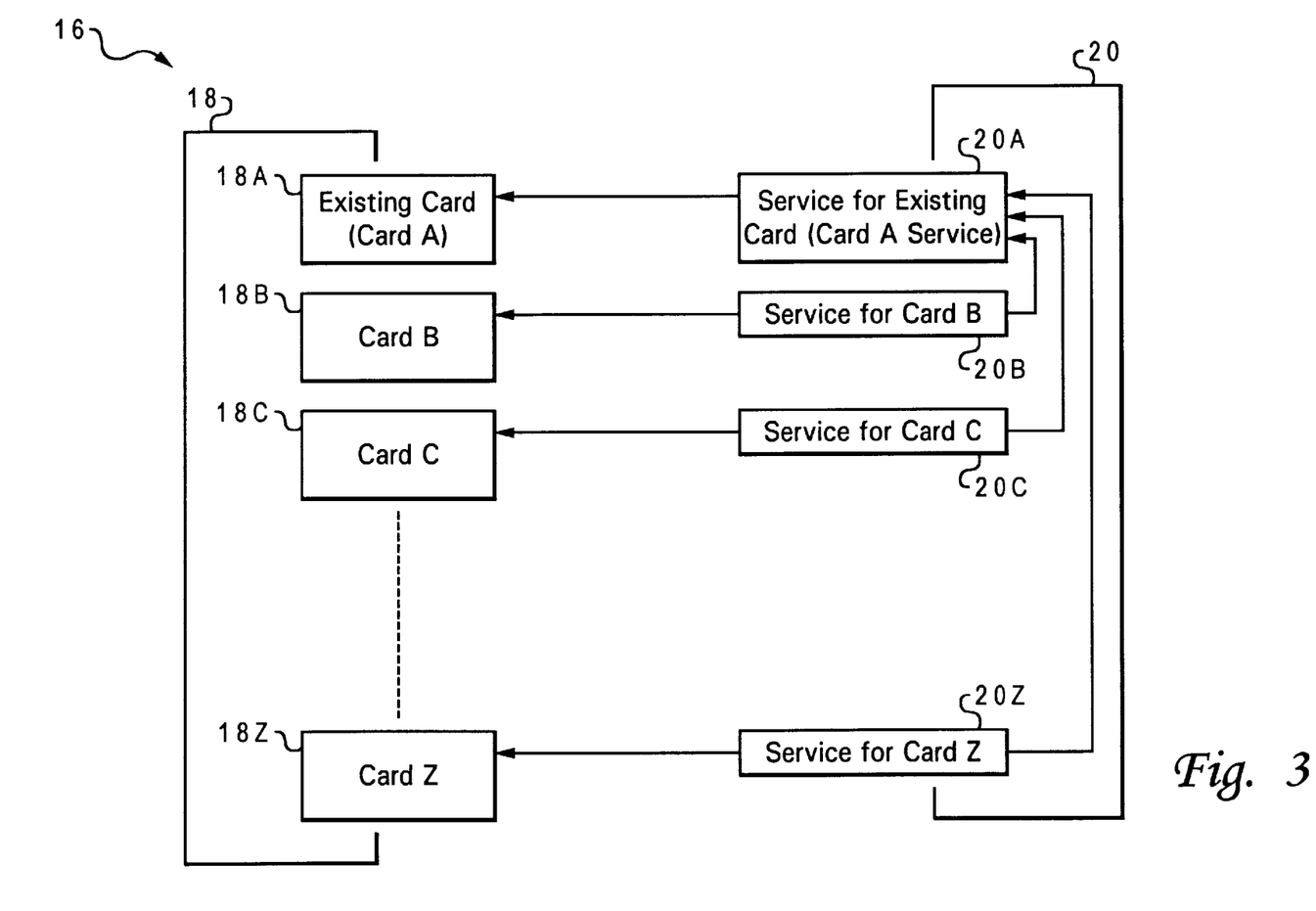
FIG. 3 is a block diagram illustrating the overloading of an existing card that has its own card service with card services of other cards.

With reference now to the figures and in particular with reference to FIG. 1, a block diagram 5 illustrating a general topology of a server system 10, client systems 12, and card terminals 14 that are used for providing the present invention system and method for overloading an existing card is shown. The server system 10 provides the present invention overloading feature for one of the existing cards 18 (see FIG. 3). The server system 10 is in communication with card terminals 14 either directly or through client systems 12. For example, existing card 18A that is shown in FIG. 3 is read by a card terminal 14. The card terminal 14 communicates with the server system 10 (directly or through a respective client system 12). The server system 10, in turn, is able to set up and provide the present invention overloading card feature for a designated or selected one of the existing cards 18 (see FIG. 3).

Figure 1A:
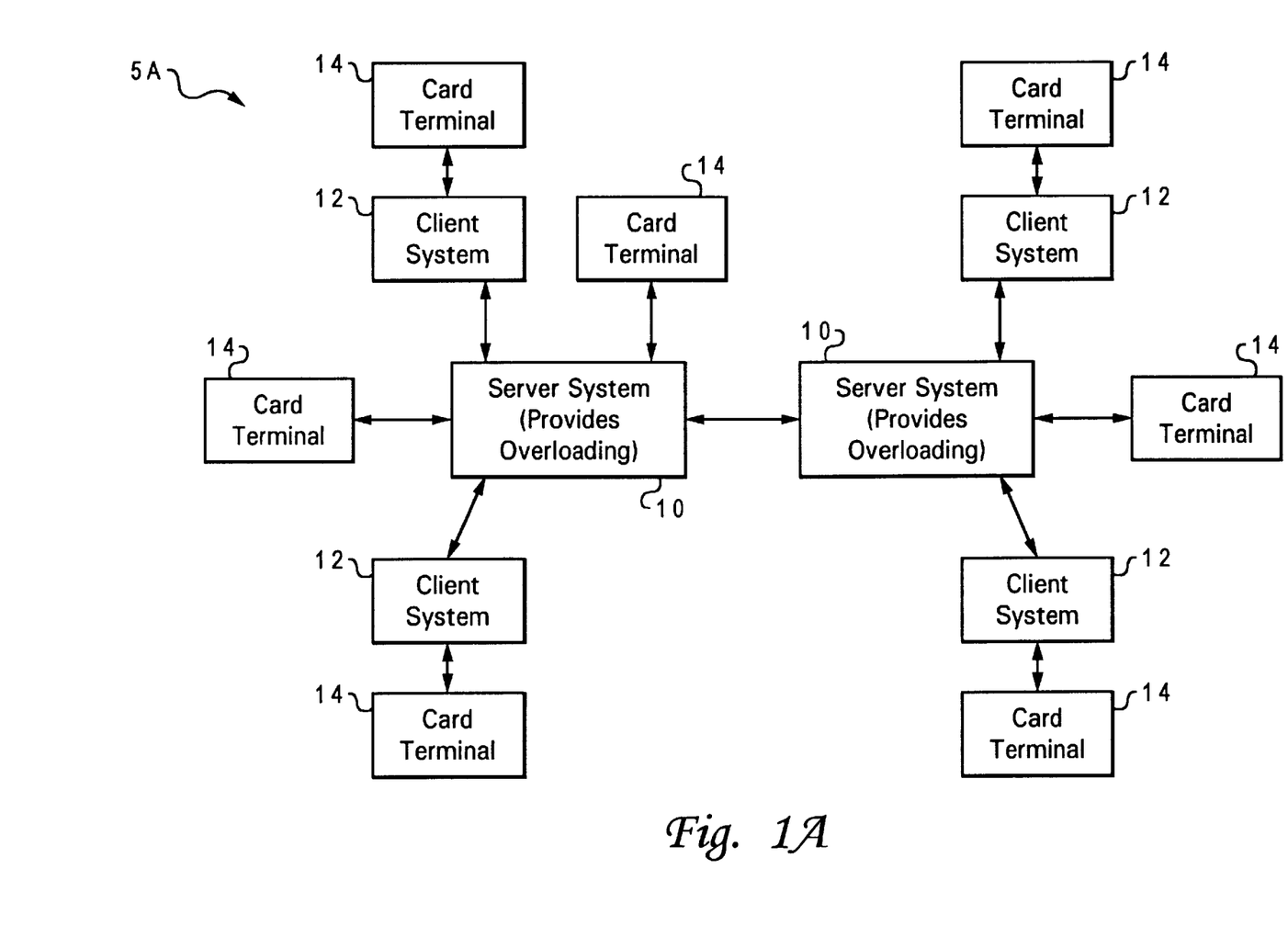
FIG. 1A is a block diagram illustrating another general topology of multiple server systems, client systems, and card terminals that are used for providing the present invention system and method for overloading an existing card.

With reference now to FIG. 1A, a block diagram 5A illustrating another general topology of multiple server systems 10, client systems 12, and card terminals 14 that are used for providing the present invention system and method for overloading an existing card is shown. The server systems 10 provide the present invention overloading feature for an existing card. The server systems 10 are in communication with each other, and the server systems 10 are also in communication with card terminals 14 either directly or through client systems 12. As an example, the existing card of FIG. 3 is read by a card terminal 14. The card terminal 14 communicates with a server system(s) 10 (directly or through a respective client system 12). The server system(s) 10, in turn, is/are able to set up and provide the present invention overloading card feature for a designated or selected one of the existing card 18.

Figure 2:
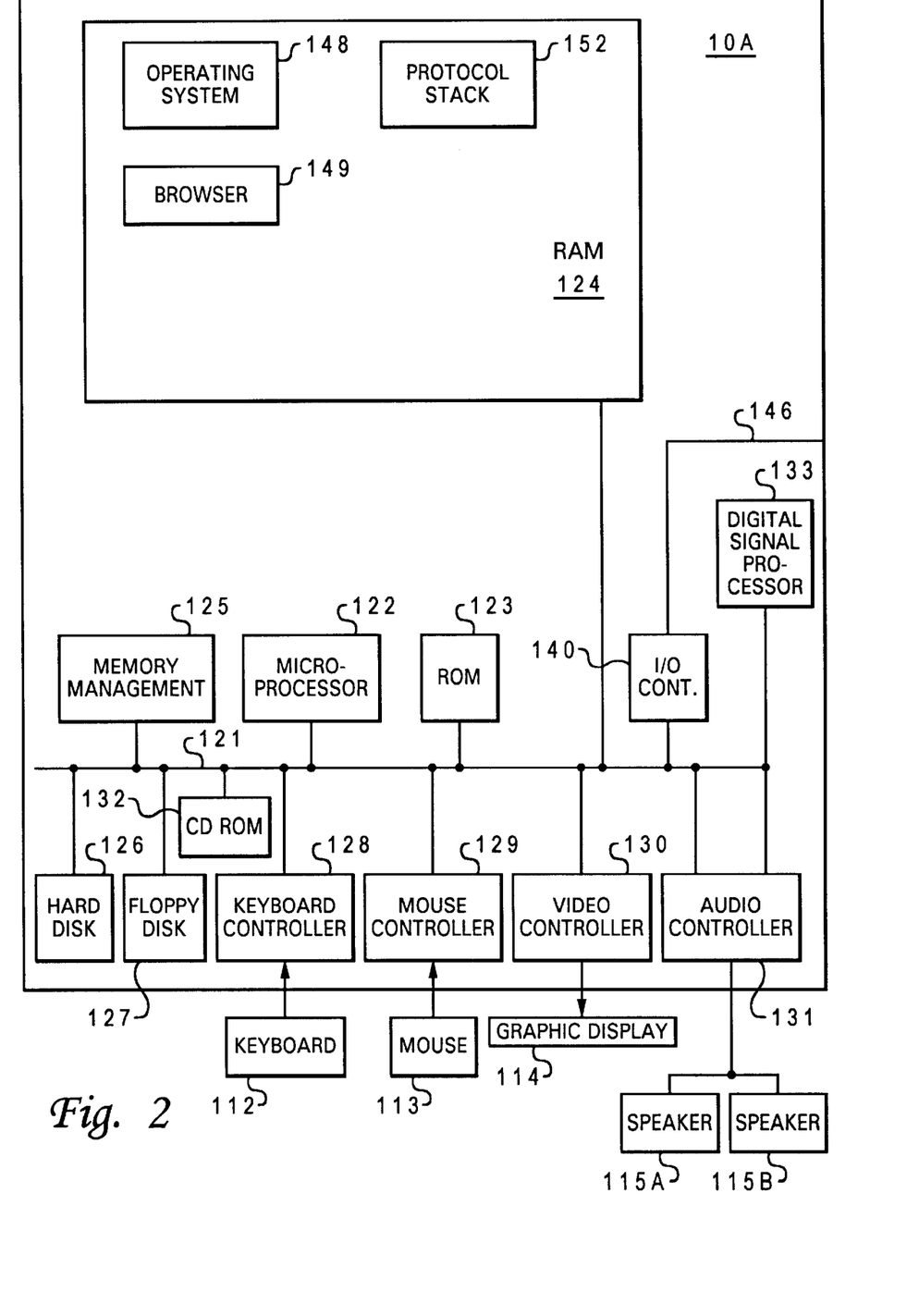
FIG. 2 is an overall example block diagram of a hardware system that may be the server system or the client system used in the present invention system and method for overloading an existing card.

With reference now to the figures and in particular with reference to FIG. 2, an overall example block diagram of the hardware system 10A, that may be for a server system 10 or a client system 12 as shown in FIGS. 1 or 1A, used in the present invention system and method for providing the present invention system and method for overloading an existing card is shown. The hardware system 10A is generally a networked system. The hardware system 10A has a number of sub-systems in communications with or to each other on a communications bus 121. The various sub-systems coupled to the bus 121 include but are not limited to the following systems or devices: a memory management system 125, a microprocessor 122, a read only memory (ROM) system 123, a random access memory (RAM) system 124, an input/output controller (I/O CONT.) 140, a digital signal processor 133, a hard disk 126, a floppy disk 127, a CD ROM 132, a keyboard controller 128, a mouse controller 129, a video controller 130, and an audio controller 131. The I/O CONT. 140 provides communications to an input/output device via line 146. A keyboard 112 is coupled to the keyboard controller 128. A mouse 113 is coupled to the mouse controller 129. A graphic display 114 is coupled to the video controller 130. Speakers 115A and 115B are coupled to the audio controller 131. The RAM system 124 is divided into at least the following memory allocations: 1) operating system 148; 2) protocol stack 152; and 3) a browser or web browser 149. Furthermore, as an example, the card terminal 14 may be any system or device that is able to read data from the existing card 18A of FIG. 3 and that is able to communicate to a server system 10 as shown in FIG. 1.

The present invention is not in any way limited to the specific topologies disclosed herein, and any system and method of providing overloading features to an existing card wherein the existing card has its own card service and is able to be overloaded with card services of other cards may be used for the present invention. The present invention is also not in any way limited to the specific hardware disclosed above for the hardware system 10A, server system 10, client system 12, card terminal 14, and any suitable system, sub-system, and/or device may be used to implement the present invention or in conjunction with the present invention.

Referring now to FIG. 3, a block diagram 16 illustrating the overloading of an already existing card 18A (i.e. Card A) that has its own card service 20A with card services 20 (Card B services 20B, Card C services 20C, . . . , Card Z services 20Z) of other cards 18 (i.e. Card B 18B, Card C 18C, . . . , Card Z 18Z). The existing card 18A (i.e. Card A) is set up to be the overloaded card or the card with the overloaded feature. As shown in FIG. 3, the existing card 18A (i.e. Card A) has its own card service 20A (i.e. Card A service 20A). The other cards 18 (i.e. Card B 18B, Card C 18C, . . . Card Z) also have their own respective card services 20 (i.e. Card B service 20B, Card C service 20C, . . . , Card Z service 20Z). The overloaded card 18A is provided by associating the card services 20 (i.e. Card B service 20B, Card C service 20C, . . . Card Z service 20Z) of the other cards 18 (i.e. Card B 18B, Card C 18C, . . . Card Z 18Z) to the existing card 18A so that the existing card 18A is the only card that has to be used and accessed to be able to use its own card service 20A as well as the other card services 20B, 20C, . . . 20Z. The server system 10 is set up and programmed to provide the overloading feature. Preferences and settings for the card services 20 associated to the existing card 18A (i.e. Card A) may be set up so that a preferred order of use of the card services 20 for the various cards 18 is followed based on various situations and scenarios. The cards 18 may be a credit card(s), a debit card(s), a membership card(s), a driver's license, an identification card, etc. Co-pending application Ser. No. 09/465,289 entitled "SYSTEM AND METHOD FOR OVERLOADING AN EXISTING CARD" discloses the overloaded card 18 in detail.

Figure 4:
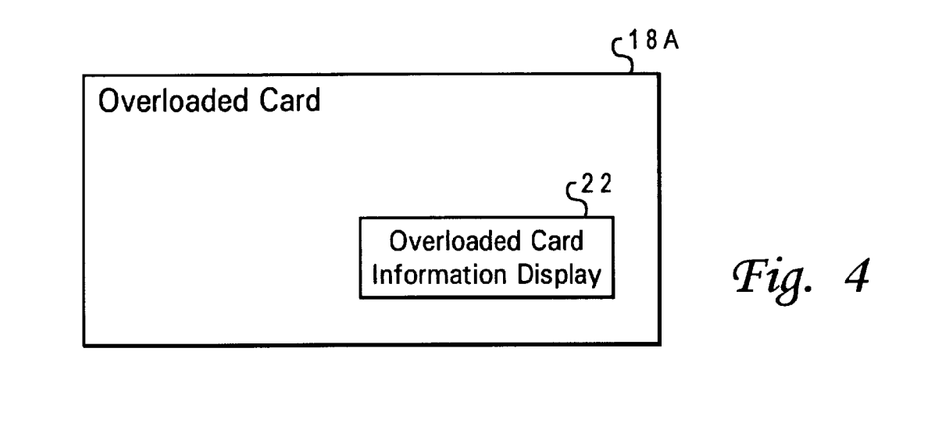
FIG. 4 is a front view of the present invention overloaded card with the overloaded card information display.

With reference now to FIG. 4, an overloaded card 18A with an overloaded card information display 22 is shown. Since the overloaded card 18A may be a main or primary card that a card holder or user carries, information maybe desired to be displayed on the overloaded card 18A. Information such as account information, transaction information, security information, etc. may be desired to be displayed on the overloaded card 18A. The present invention is not in anyway limited to any specific type of information that is to be displayed on the overloaded card information display 22 of the overloaded card 18A, and any suitable type of information maybe displayed. For example, a last transaction or series of transactions in which the overloaded card 18A has been used and engaged may be desired to be displayed on the overloaded card information display 22 of the overloaded card 18A. Thus, the card holder or user has ready access and a log of the last transaction(s) that is displayed right on the overloaded card 18A (i.e. transactions that show which card services 20 of which cards 18A were last charged and for which purchases that were made at which locations). As another example, a company may want to be able to advertise services to a card holder or user by displaying the advertisement directly on the overloaded card 18A. The information within the display 22 may be changed every time the overloaded card 18A is being used and read at a card terminal 14 (see FIG. 1).

The overloaded card 18A is read by any suitable reader at a card terminal 14, and an array of electrodes for writing to the display 22 is positioned at or within the reader. The array of electrodes is positioned in such a manner so that when the overloaded card 18A is being read by the reader and writing is to be done on the display 22 by the array of electrodes, the array of electrodes in the reader faces the display 22 and charge and manipulate the balls 24 to programmed or desired images that are to be left on the display 22. The array of electrodes have an array of positive or negative charges thereunder in order to respectively turn the balls 24 to the respective white or black positions. Images to be written on the display 22 are programmed at and controlled by the array of electrodes. The array of electrodes acts as a writer for the display 22 to leave programmed or desired images thereon.

Figure 5:
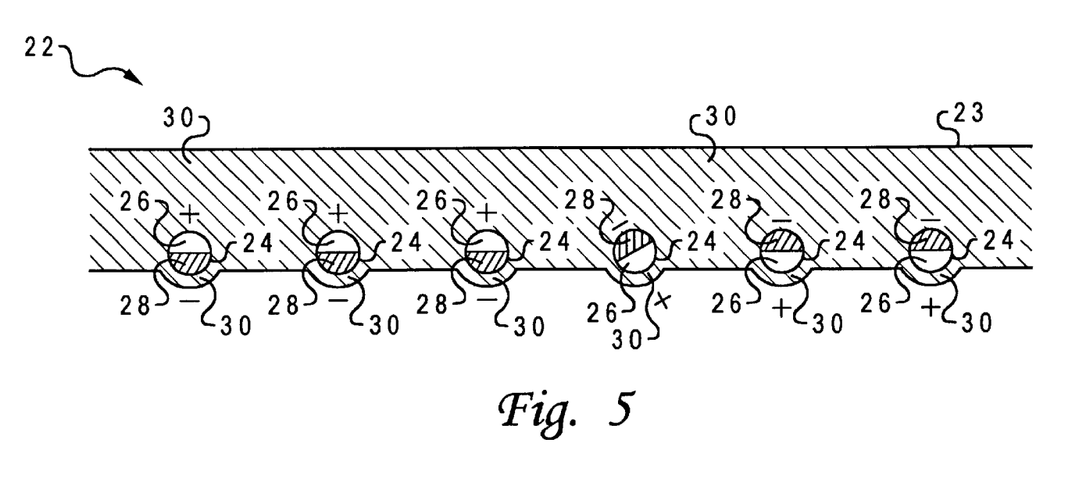
FIG. 5 is a cross-sectional view of a portion of an example overloaded card information display for an overloaded card.

Referring to FIG. 5, a cross-sectional view of a portion of an example overloaded card information display 22 for the overloaded card 18A is shown. The display 22 is a flexible flat sheet. The flexible flat sheet is made of a silicone sheet 23 that is embedded with the array of electrically charged and maneuvered balls 24, which are electrets. Each ball 24 has a white side 26 and a black side 28. The sheet 23 is impregnated with oil or other suitable fluid 30 so that the balls 24 are able to be freely rotated. An electric or electrostatic field is applied to each ball in a manner so that it rotates to either show the respective white side 26 or black side 28 or a portion of both the white side 26 and black side 28. FIG. 5 shows that the white side 26 follows the positive charge while the black side 28 follows the negative charge. Thus, depending on where the positive charge and negative charge are applied to a ball 24, the white side 26 or the black side 28 or a portion of both the white side 26 and black side 28 will be shown and displayed from the display 22.

Therefore, a respective applied electric or electrostatic charge is applied to each ball 24 to provide a desired display of information on the display 22. The electric charges are set or programmed to rotate the balls 24 to respective positions to provide the images to display the desired information. The charges are applied from the card terminal 14 when the overloaded card 18A is being used and read by the card terminal 14. The programming or setting of the electric charges to rotate the balls 24 are changed or altered in order to provide a new or different image or display of information. The present invention is not in any way limited to the specific display 22 disclosed herein, and any suitable display for showing information and images on an overloaded card may be used. Furthermore, the display 22 does not require a power source in the overloaded card 18A. Also, multiple displays 22 may be provided for each overloaded card 18A as well to provide multiple displays thereon.

While the invention has been particularly shown and described with reference to a preferred embodiment, it will be understood by those skilled in the art that various changes in form and detail may be made therein without departing from the spirit and scope of the invention.

What is claimed is:

1. A method of providing and using a host card with multiple card services, comprising the steps of:

associating a host card having an associated card service with at least one other service, wherein said at least one other service is associated with at least one other card;

managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated, and displaying information on a display on the host card in accordance with the managing of said host card.

2. The method according to claim 1, wherein the displayed information is advertising information.

3. The method according to claim 1, wherein the displayed information is transaction information.

4. The method according to claim 3, wherein the transaction information is at least one last transaction information.

5. The method according to claim 1, wherein the displayed information is security information.

6. The method according to claim 1, wherein the displaying step further comprises the step of:

providing multiple displays on the host card for displaying the desired information thereon.

7. The method of claim 1, wherein said display comprises an electret ball array, said displaying further comprising:

placing said electret ball array under an array of electrodes within a card reading device; and in response to reading the host card within the card reading device, applying an electric field from said array of electrodes to said electret ball array, wherein said electric field rotatably manipulates individual electrets within said electret ball array such that an image is displayed on said electret ball array.

8. The method according to claim 7, the step of applying an electric field from said array of electrodes to said electret ball array further comprising the step of:

programming individual electrodes within said array of electrodes to have either a positive or a negative charge.

9. A system of providing and using a card with multiple card services, comprising:

means for associating a host card having an associated card service with at least one other service, wherein said at least one other service is associated with at least one other card, means for managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated, and displaying information on the host card in accordance with the managing of said host card.

10. The system according to claim 9, wherein the displayed information is advertising information.

11. The system according to claim 9, wherein the displayed information is transaction information.

12. The system according to claim 11, wherein the transaction information is at least one last transaction information.

13. The system according to claim 9, wherein the displayed information is security information.

14. The system according to claim 9, wherein the host card does not require a power source therein to display the desired information.

15. The system according to claim 9, wherein the means for managing the host card includes multiple displays on the host card.

16. The system according to claim 9, further comprising:

a display writer containing an array of electrodes that represents programmed images that is used in order to apply electric fields to an array of electrets within a host card display.

17. The system according to claim 16, wherein said array of electrets is embedded within a flexible flat silicon sheet, said array of electrets comprising electrically maneuverable balls that each have a white side and a black side.

18. The system of claim 17, wherein said flexible flat silicon sheet is impregnated with a lubricant such that said electrically maneuverable balls can freely rotate in response to an applied electric field.

* * * * *